US011974901B2

(12) United States Patent
Park et al.

(10) Patent No.: US 11,974,901 B2
(45) Date of Patent: May 7, 2024

(54) SMALL ANIMAL INTRAVENTRICULAR INJECTION COMPENSATOR

(71) Applicants: Sung Gurl Park, Daejeon (KR); KOREA RESEARCH INSTITUTE OF CHEMICAL TECHNOLOGY, Daejeon (KR)

(72) Inventors: Sung Gurl Park, Daejeon (KR); Kang Hyun Han, Daejeon (KR); Chang Mook Lim, Cheonan-si (KR); So Ra Park, Jinju-si (KR); Hong Su Lee, Iksan-si (KR); Jae Bong Lee, Jeonju-si (KR); Jung Ho Noh, Sejong-si (KR); Sang Seop Han, Daejeon (KR)

(73) Assignees: Sung Gurl Park, Daejeon (KR); KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 773 days.

(21) Appl. No.: 17/058,847

(22) PCT Filed: Jul. 18, 2019

(86) PCT No.: PCT/KR2019/008910
§ 371 (c)(1),
(2) Date: Nov. 25, 2020

(87) PCT Pub. No.: WO2020/017911
PCT Pub. Date: Jan. 23, 2020

(65) Prior Publication Data

US 2021/0205063 A1 Jul. 8, 2021

(30) Foreign Application Priority Data

Jul. 19, 2018 (KR) ........................ 10-2018-0084044

(51) Int. Cl.
*A61D 3/00* (2006.01)
*A61D 7/00* (2006.01)
*A61D 7/04* (2006.01)

(52) U.S. Cl.
CPC ................. *A61D 3/00* (2013.01); *A61D 7/00* (2013.01); *A61D 7/04* (2013.01); *A61D 2003/003* (2013.01)

(58) Field of Classification Search
CPC ........ A61B 17/3403; A61B 2017/3405; A61B 2017/3407; A61B 90/17; A61B 90/14;
(Continued)

(56) References Cited

U.S. PATENT DOCUMENTS 4,254,767 A * 3/1981 Mixon, Jr. .............. A61M 5/00
128/869
4,620,540 A * 11/1986 Goodale .................. A61D 3/00
604/116

(Continued)

FOREIGN PATENT DOCUMENTS

CN 103340697 A 10/2013
JP 2008-200007 A 9/2008

(Continued)

OTHER PUBLICATIONS

International Search Report for PCT/KR2019/008910 mailed Oct. 28, 2019 from Korean Intellectual Property Office.

*Primary Examiner* — Peter M Poon
*Assistant Examiner* — Jeffrey R Larsen
(74) *Attorney, Agent, or Firm* — Paratus Law Group, PLLC

(57) ABSTRACT

Disclosed is a small animal intraventricular injection compensator for injecting a drug into a desired location through a syringe, the compensator including: a guide part provided with a guide hole into which a needle of a syringe is inserted;
(Continued)

a body comprising an upper cavity provided inside thereof and a cradle provided to seat the guide part on an upper side thereof; and a fixation part integrally provided with the body or separately provided, and comprising a lower cavity provided to allow a head accommodation space, which a head of a small animal may enter into or exit from, to be provided inside thereof by corresponding to the upper cavity.

7 Claims, 9 Drawing Sheets

(58) Field of Classification Search
CPC .... A61B 90/11; A61D 3/00; A61D 2003/003; A61D 7/04; A01K 1/0613; A01K 1/031; A01K 15/04; A22B 1/00
USPC ........... 119/752, 729, 815; 452/54; 606/130; 604/116
See application file for complete search history.

(56) References Cited

U.S. PATENT DOCUMENTS

| | | | | |
|---|---|---|---|---|
| 2011/0257594 | A1* | 10/2011 | Lacoursiere ........... | A61B 90/11 604/117 |
| 2012/0073515 | A1* | 3/2012 | Chung ..................... | A61D 7/00 119/756 |
| 2014/0107523 | A1 | 4/2014 | Petraglia et al. | |

FOREIGN PATENT DOCUMENTS

| | | | |
|---|---|---|---|
| KR | 10-0647491 | B1 | 11/2006 |
| KR | 10-1149530 | B1 | 5/2012 |

* cited by examiner

SMALL ANIMAL INTRAVENTRICULAR INJECTION COMPENSATOR

CROSS-REFERENCE TO PRIOR APPLICATIONS

This application is a National Stage Patent Application of PCT International Patent Application No. PCT/KR2019/008910 (filed on Jul. 18, 2019) under 35 U.S.C. § 371, which claims priority to Korean Patent Application No. 10-2018-0084044 (filed on Jul. 19, 2018), which are all hereby incorporated by reference in their entirety.

BACKGROUND

The present invention relates to a small animal intraventricular injection compensator for injecting a drug through a syringe to a desired location and, more particularly, to a small animal intraventricular injection compensator for accurately injecting a drug into a ventricle of a small animal in a state where the small animal is safely immobilized.

In order to evaluate the efficacy of drugs that do not pass through a blood-brain barrier, or new drugs, the drugs described above are injected through a syringe into ventricles of small animals such as laboratory rats, whereby a reaction of the small animals is investigated.

At this time, when an experimenter uses the syringe to inject drugs into the ventricle of the small animal, accuracy varies depending on a skill of the experimenter, and there is a disadvantage in that reproducibility is significantly reduced.

In order to improve this, conventionally, in a state where teeth of the small animal are immobilized using a bar, or ears of the small animal are immobilized using rods being placed thereinto, a technique for animal stereotactic correction device has been disclosed, in which skin of the small animal is incised to confirm the zero point of the skull, and then a correct intraventricular position is assessed and the drug is injected. In addition, technologies such as Korean Patent No. 10-0647491 (A stereotactic device for radiosurgery in experimental animal, which is capable of being used for the gammaknife radiosurgery apparatus, published on Nov. 13, 2006 and owned by Samsung Life Public Welfare Foundation, Social Welfare Foundation), U.S. Pat. No. 4,620,540 (Mold for rapid stereotaxic injections into mouse striatum, published on Nov. 4, 1986 and owned by Micromedical Research and Development Company), and the like have been disclosed.

However, in the case of the above-mentioned animal stereotactic correction devices, they are expensive and take much time to operate, and there is a hassle that intraperitoneal injection or vascular injection is to be performed in parallel for anesthesia of small animals. In addition, surgical treatment of incising the skin is essentially included, and when immobilizing a small animal through teeth or ears, it causes severe stress to the small animal, and thus has a disadvantage in that the reliability of experimental results due to drug injection may be deteriorated.

In particular, in the case of a drug or cell therapy product that requires injection before the biological drug's physiological activity is hindered, injection of the drug is required to be not only accurate but also rapid. However, the above methods have a disadvantage taking a long time to inject the drug and thus having poor reproducibility or reliability.

SUMMARY

Accordingly, the present invention has been proposed to solve the above problems and is to provide a small animal intraventricular injection compensator that enables rapid and accurate drug injection into a ventricle of the small animal wherein an indicator is provided so that a head of the small animal is always immobilized at a constant position, and a guide hole is provided for guiding drug injection into the ventricle of the small animal.

In addition, the present invention is to provide a small animal intraventricular injection compensator that enables anesthesia to be performed at the same time as immobilization of the small animal by providing a breathing anesthesia portion to enable respiratory anesthesia when immobilizing the small animal.

In order to accomplish the above objective, the present invention may provide a small animal intraventricular injection compensator, the compensator including: a guide part 1100 provided with a guide hole 1110 into which a needle of a syringe S is inserted; a body 1200 comprising an upper cavity 1220 provided inside thereof and a cradle 1210 provided to seat the guide part 1100 on an upper side thereof; a fixation part 1300 integrally provided with the body 1200 or separately provided from the body 1200, and comprising a lower cavity 1310 provided to allow a head accommodation space 1230, which a head of a small animal can enter into or exit from, to be provided inside thereof by corresponding to the upper cavity 1220; and an indicator 1400 provided at the guide part 1100 or the body 1200 and provided to allow an experimenter to see with naked eyes a predetermined portion of the head of the small animal inserted into the head accommodation space 1230 at an upper side of the guide part 1100 or the body 1200.

The indicator 1400 of the present invention may be a gap having a predetermined length and width provided between a side surface of the guide part 1100 and a side surface of the cradle 1210, on which the guide part 1100 is seated, wherein, using the gap, it may be determined whether the head inserted into the head accommodation space 1230 is disposed at a right position.

The guide part 1100 of the present invention may further include a guide groove 1110 for inserting and fixing a syringe S, wherein sectional shapes of both the guide groove 1110 and a tip end side of the syringe S inserted into the guide groove 1110 coincide with each other.

Whether or not the head of the small animal of the present invention is in place may be determined by determining whether or not a tip of an eye tail of the small animal coincides with a fore-end or tip end portion of the gap.

The guide hole 1120 of the present invention may be eccentric by a predetermined distance ΔI to one side with respect to a centerline CL of the guide part 1100, or a pair of guide holes 1120 may be each provided to be spaced by a predetermined distance ΔI to opposite sides with respect to the centerline CL of the guide part.

The compensator may further include an anesthesia gas inlet 1240 provided on an opposite side of the head accommodation space 1230 of the present invention.

The guide part 1100, the body 1200, and the fixation part 1300 of the present invention may be provided integrally, or are coupled to each other by magnetic force.

The guide part 1100 of the present invention may include: a second guide part **1100*b* seated on the cradle 1210; and a first guide part 1100*a* coupled to a top side of the second guide part 1100*b***.

The small animal intraventricular injection compensator of the present invention is advantageous in that the compensator enables a small animal to be uniformly immobilized at a specific position; anesthesia and immobilization of the small animal can be performed at the same time; and drug injection can be performed rapidly, accurately, and reproducibly by allowing the drug to be accurately injected into a ventricle of the small animal through the operation of inserting an injection needle into a guide hole.

In addition, injection for separate anesthesia is not required, and surgical treatment is also unnecessary, thereby simplifying the drug injection process.

In addition, there is an effect wherein the reliability of an experiment when injecting the drug can be enhanced by avoiding immobilization through teeth or ears that may cause stress when immobilizing small animals.

In addition, as rapid intraventricular drug injection becomes possible, there is an effect of enhancing the reliability in the experiment of drugs or cell therapy products that require injection before the biological activity of the biological drug is inhibited.

DETAILED DESCRIPTION

Hereinafter, an embodiment of the present invention will be described in detail with reference to the drawings.

Figure 1:
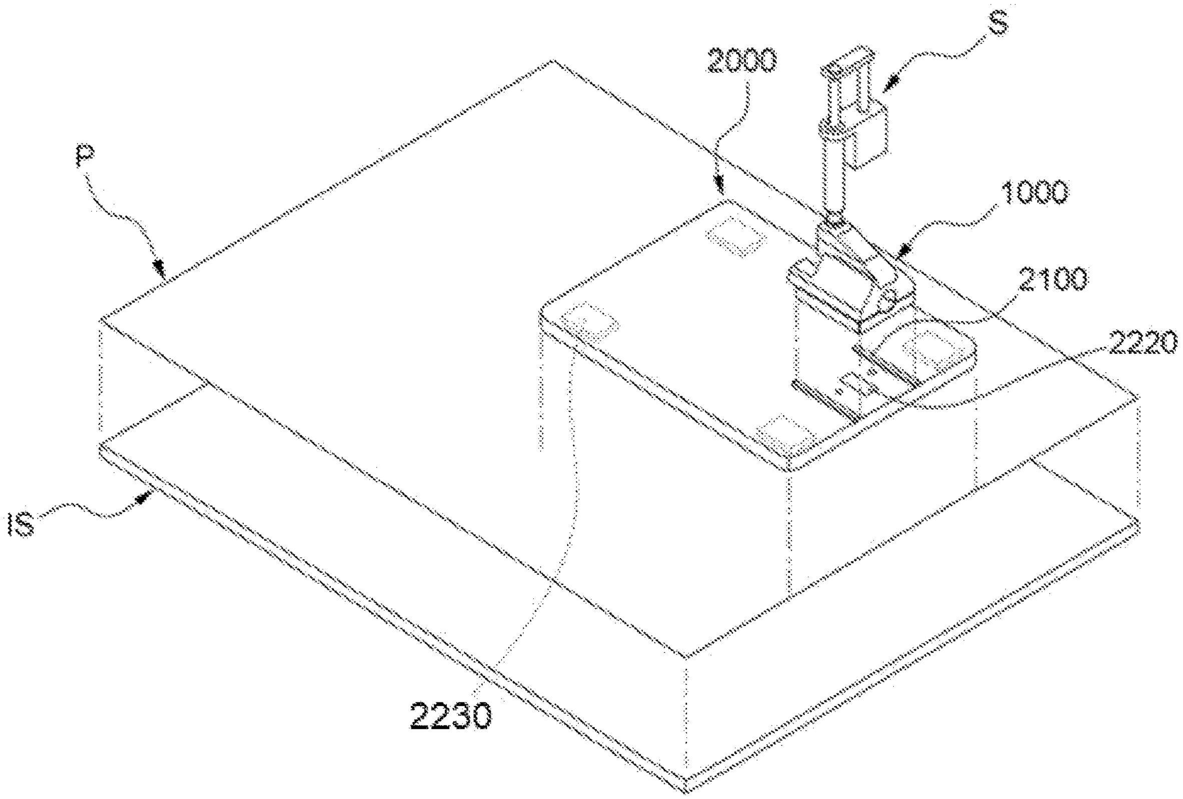
FIG. 1 is an overall conceptual view including a small animal intraventricular injection compensator according to the present invention.

Shown in FIG. 1 is an overall perspective view including a small animal intraventricular injection compensator (hereinafter referred to as a 'compensator') according to an embodiment of the present invention. As shown, the compensator is for inserting and immobilizing a small animal, especially, a head of the small animal, therein. A drug is injected into a ventricle of the small animal using a needle of a syringe while the small animal is immobilized. The present invention may be configured to include a head immobilization module 1000 for guiding the ventricle of the small animal, and a module fixation plate 2000 in which a body of the small animal is supported and the head immobilization module 1000 is immobilized.

With reference to FIG. 1, the head immobilization module 1000 may be configured to be 'detachable' from the module fixation plate 2000. Here, the 'detachable' refers to be detachable not only by magnetic force but also, for example, by a combination of protrusions and grooves and the like. In addition, a plurality of the head immobilization module 1000 having different sizes may be configured to be mounted in a replaceable manner so as to be applied to each of various kinds of small animals.

With reference to FIG. 1, the module fixation plate 2000 may be provided in a plate shape so as to have the head immobilization module 1000 coupled to a top side thereof. Fixation protrusions or fixation grooves 2100 may be provided on the top side of the module fixation plate 2000 such that fixation grooves or protrusions (not shown) provided on a bottom surface of the head immobilization module 1000 are inserted correspondingly. A second magnet insertion groove 2220 equipped with a second magnet may be provided at a portion on the top side of the module fixation plate 2000, the portion corresponding to a first magnet insertion groove (not shown) equipped with a first magnet provided on the bottom surface of the head immobilization module 1000. By allowing the surfaces corresponding to and facing each other to have different polarities, the head immobilization module 1000 and the module fixation plate 2000 may be magnetically coupled.

With reference to FIG. 1, a third magnet insertion groove 2230 to be equipped with a third magnet is configured to be provided on a bottom surface of the module fixation plate 2000, so that the magnet may be inserted and immobilized thereto. Accordingly, the compensator 1000 of the present invention is configured to be easily mounted on a metal stage or an iron sheet (IS). In order to absorb feces of the small animals that may be excreted during the experiment, a pad P may be interposed between the module fixation plate 2000 and the iron sheet IS.

The head immobilization module 1000 will be described in detail.

FIGS. 2 to 7 are views showing exploded perspective views or assembled-state perspective views showing the head immobilization module 1000 of the present invention.

As shown, the head immobilization module 1000 is configured to include a body 1200 which the head of the small animal is inserted into and immobilized to, a guide part 1100 provided on the upper side of the body 1200 and guiding a needle of a syringe S into a ventricle of the small animal in a state where the head of the small animal is immobilized, and a fixation part 1300 provided on a bottom side of the body 1200 to fix the head immobilization module 1000 to the module fixation plate 2000.

Figure 2:
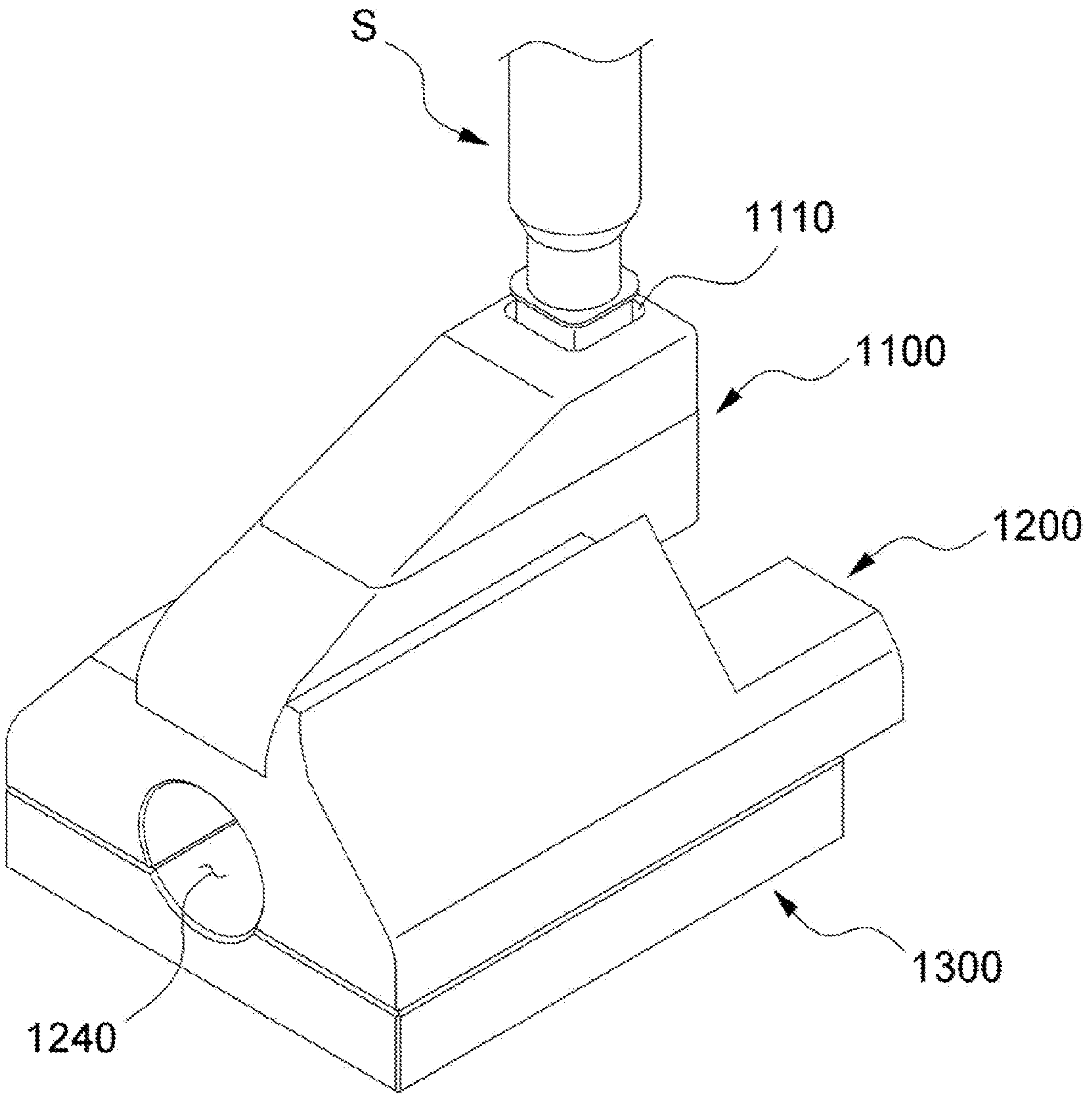
FIG. 2 is a conceptual view of a head immobilization module in which a syringe is inserted of the small animal intraventricular injection compensator according to the present invention.
Figure 9:
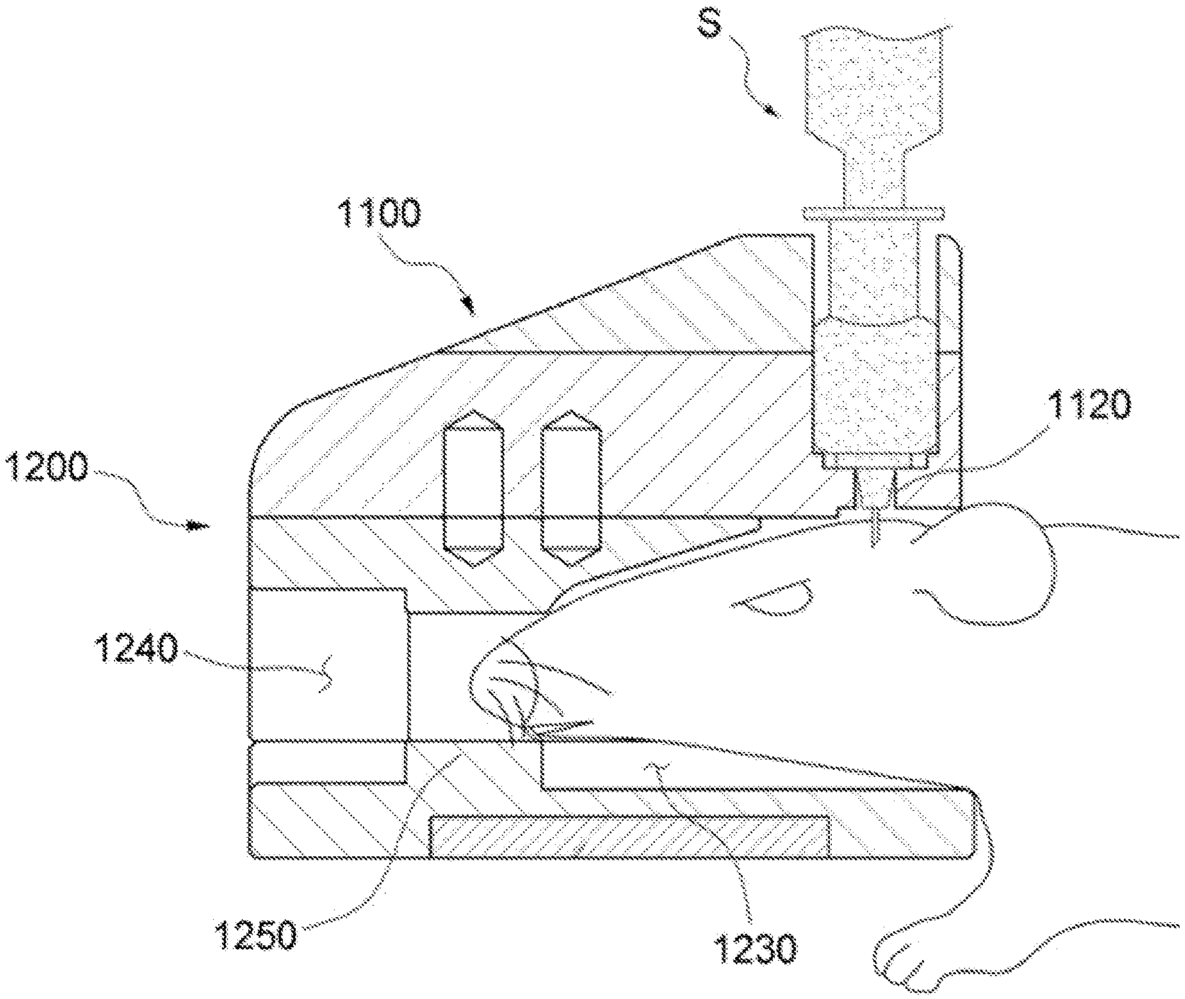
FIG. 9 is a side conceptual view for determining whether the small animal is inserted, at a right position, into the head immobilization module of the small animal intraventricular injection compensator according to the present invention.

As shown in FIG. 2, a guide part 1100 is provided with a guide groove 1110 for inserting and fixing the syringe S. With reference to FIGS. 2 and 9, sectional shapes of both the guide groove 1110 and a tip end side of the syringe S inserted into the guide groove 1110 may coincide with each other. As shown in FIGS. 2 and 9, a tip end portion of the syringe S is provided in a square shape. The guide groove 1110 is provided in the square shape the same as above so that the tip end portion of the syringe S may be inserted and accommodated. In this case, the syringe S is prevented from being arbitrarily rotated after being inserted so that stable injection may be possible. On the other hand, the tip end side of the syringe S may be provided in a polygonal shape, and a sectional shape of the guide groove 1110 may be provided accordingly.

On the other hand, with reference to FIG. 2, an anesthesia gas inlet 1240, which is connected to an anesthesia gas supply means (not shown) provided separately and is communicated with a head accommodation space 1230, may be provided on an opposite side of the body 1200. Accordingly, the compensator is configured such that the head of the small animal may be anesthetized through the anesthesia gas inlet 1240 while being immobilized inside the body 1200. The small animals may be allowed to breathe through the anesthesia gas inlet 1240.

Figure 3:
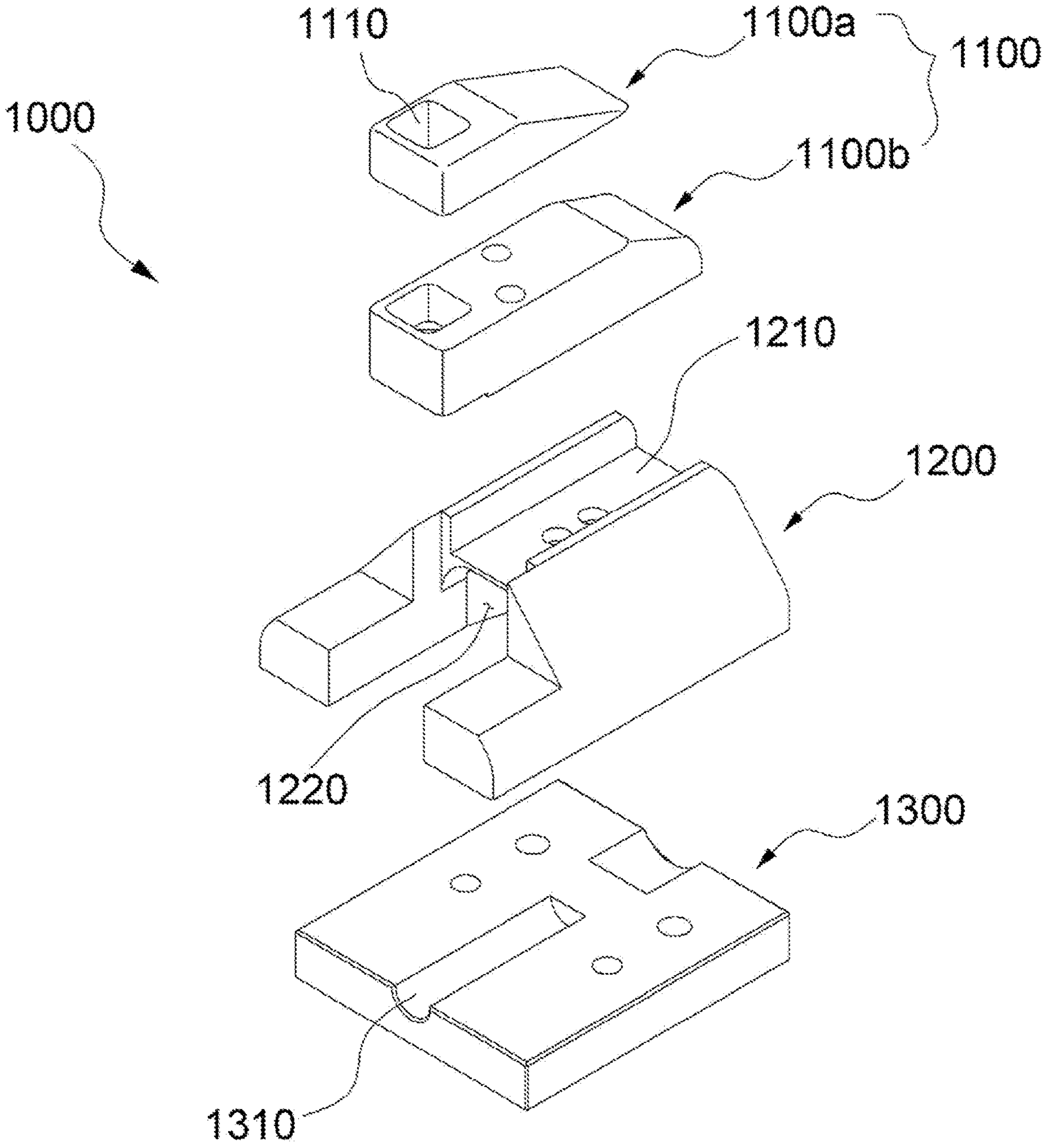
FIG. 3 shows exploded conceptual views of the head immobilization module of the small animal intraventricular injection compensator according to the present invention.

With reference to FIGS. 3 and 9, the body 1200 is provided in a hull shape having an upper cavity 1220 provided inside thereof, and a lower cavity 1310 corresponding to the upper cavity is provided in the fixation part 1300. The head accommodation space 1230 is provided between the spaces of the upper and lower cavities 1220 and 1310, respectively, by the combination of the body 1200 and the fixation part 1300.

Figure 5:
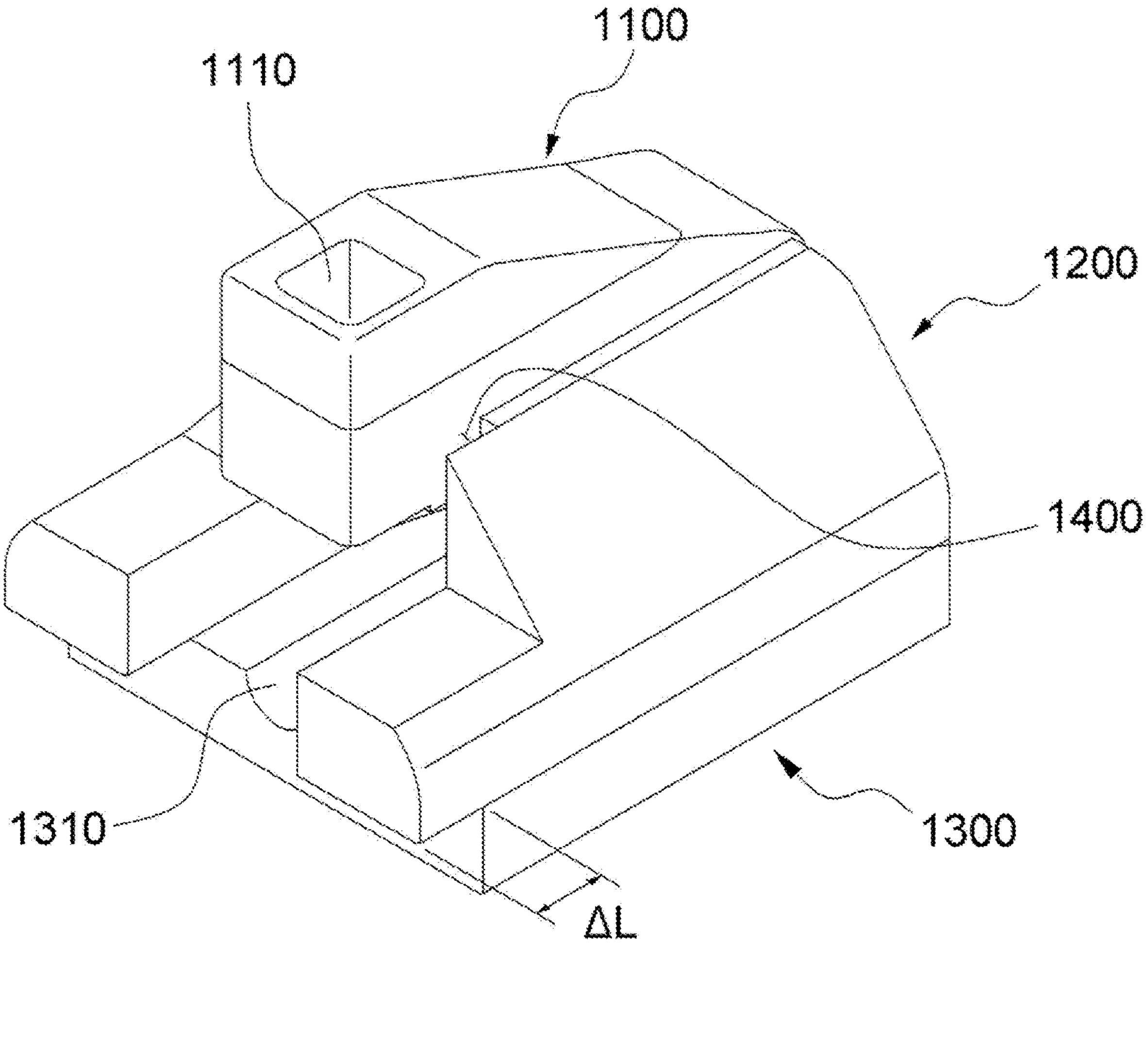
FIG. 5 is a conceptual view of the head immobilization module of the small animal intraventricular injection compensator according to the present invention.
Figure 8:
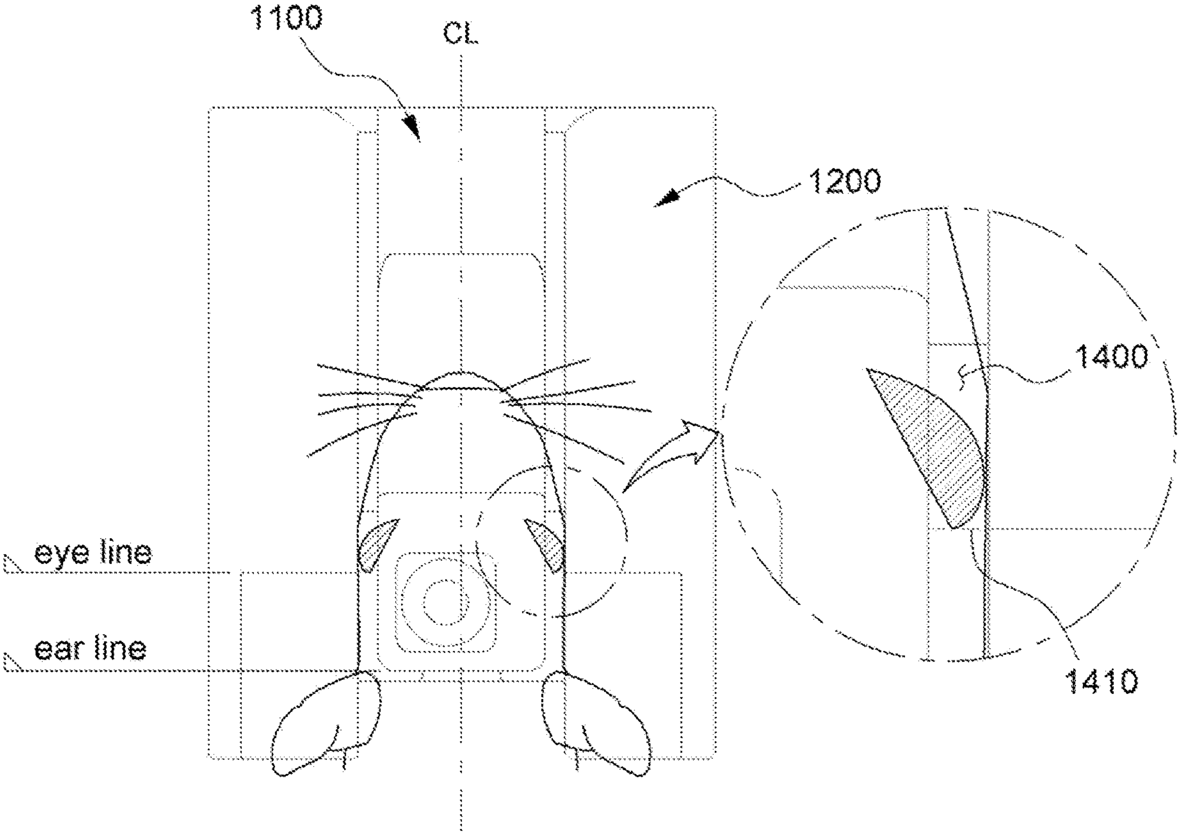
FIG. 8 is a top conceptual view for determining whether the small animal is inserted, at a right position, into the head immobilization module of the small animal intraventricular injection compensator according to the present invention.

As shown in FIGS. 5, 8, and 9, a head of a small animal is inserted into the head accommodation space 1230.

With reference to FIG. 5, the body 1200 and the fixation part 1300 have a length difference by a predetermined distance ΔL. That is, length of the body 1200 is longer than length of the fixation part 1300. This is to secure the space in a downward direction of the body 1200 so that the front legs of a small animal may be stably positioned when the head of the small animal is inserted.

With reference to FIGS. 5 to 8, the head immobilization module 1000 of the present invention may be provided with an indicator 1400 guiding a head of a small animal so that the head of the small animal may be immobilized at an accurate position (a position where a drug may be injected in an accurate intraventricular position).

Figure 6:
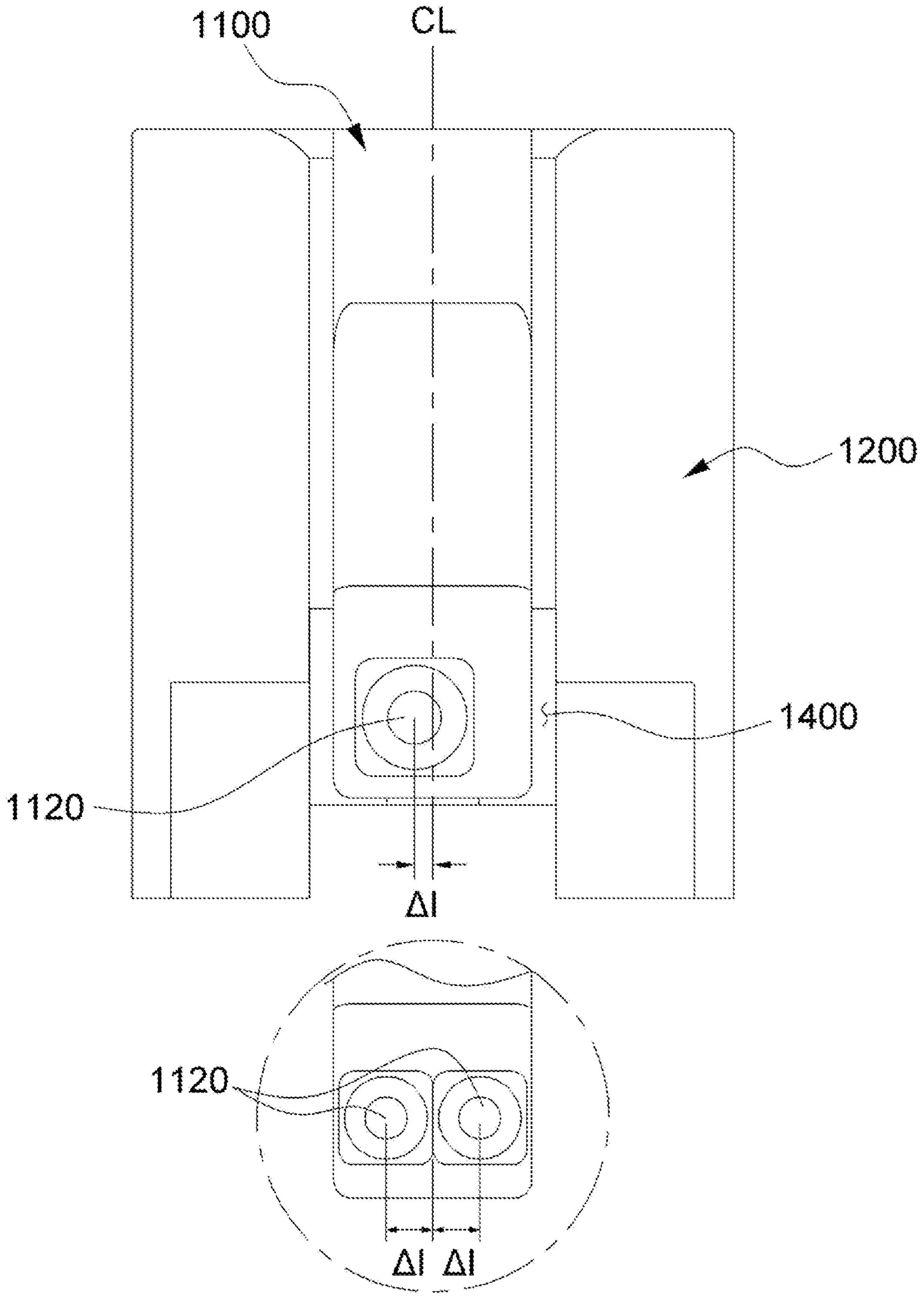
FIG. 6 is a top conceptual view of the head immobilization module of the small animal intraventricular injection compensator according to the present invention.
Figure 7:
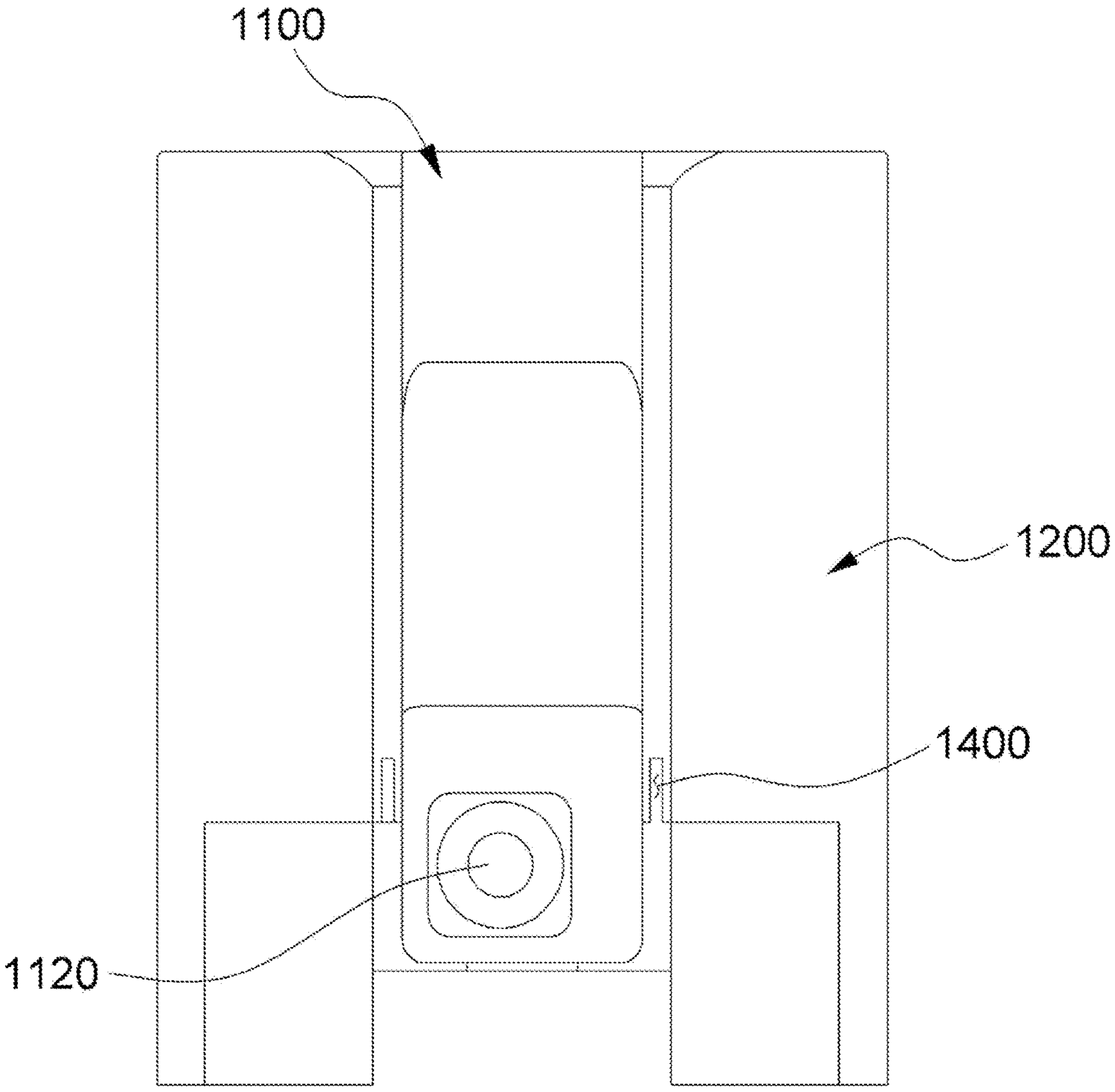
FIG. 7 is another top conceptual view of the head immobilization module of the small animal intraventricular injection compensator according to the present invention.

With reference to FIGS. 6 and 7, the indicator 1400 may be provided on the guide part 1100 or the body 1200. The indicator 1400 is provided so that an experimenter may see with naked eyes a predetermined portion of the head of the small animal inserted into the head accommodation space 1230 from the upper side of the guide part 1100 or the body 1200. When the experimenter identifies with the naked eye a specific portion of the head (a tail area of an eye in the case of the present invention) of the small animal using the indicator 1400, it is determined that the head of the small animal is inserted into a right position.

In the case of manufacturing a small animal intraventricular injection compensator such as the present invention, a position of the indicator 1400 may be appropriately changed according to a location of a ventricle of the small animal.

For the indicator 1400 shown in FIG. 6, a groove is provided on one side surface of the body 1200, thereby providing a gap between the body 1200 and the guide part 1100, while for the indicator 1400 shown in FIG. 7, a groove is provided by cutting a part of the body.

With reference to FIGS. 5, 6, and 8, the indicator 1400 of the present invention is shown as a gap having a predetermined length and width provided between the side surface of the guide part 1100 and the side surface of a cradle 1210 on which the guide part 1100 is seated. Using the gap, it may be determined whether the head inserted into the head accommodation space 1230 is disposed at the right position.

A method of fixing the right position of the head through the indicator 1400, which is the aforementioned gap, will be described later with reference to the drawings.

With reference to FIG. 3, the guide part 1100 is provided on an upper side of the body 1200. The guide part 1100 is seated on the cradle 1210 provided on the upper side of the body 1200. The cradle 1210 is provided along a longitudinal direction of the body 1100. The guide part 1100 is provided on the upper side thereof with a guide groove 1110 to allow the drug to be injected into the ventricle when the head is immobilized. The guide groove 1110 is provided to be recessed downward from an upper surface of the guide part 1100 so that one side of the syringe S may be inserted. A guide hole 1120 (see FIGS. 6 and 9) may be provided on the guide groove 1100 so as to guide an injection needle to the ventricle. The compensator is configured such that, when the injection needle is inserted along the guide hole 1120, the drug is injected such that the injection needle is accurately inserted into the ventricle of the small animal.

On the other hand, with reference to FIG. 6, the guide hole 1120 may be eccentric by a predetermined distance ΔI to one side with respect to a centerline CL of the guide part 1120, or a pair of guide holes 1120 each may be provided to be spaced by a predetermined distance ΔI to opposite sides with respect to the centerline CL of the guide part. This is that the location of the guide hole 1120 and the guide groove 1100 may be changed according to the purpose of the drug to be injected to the ventricle of a small animal or the desired location of the ventricle.

Figure 4:
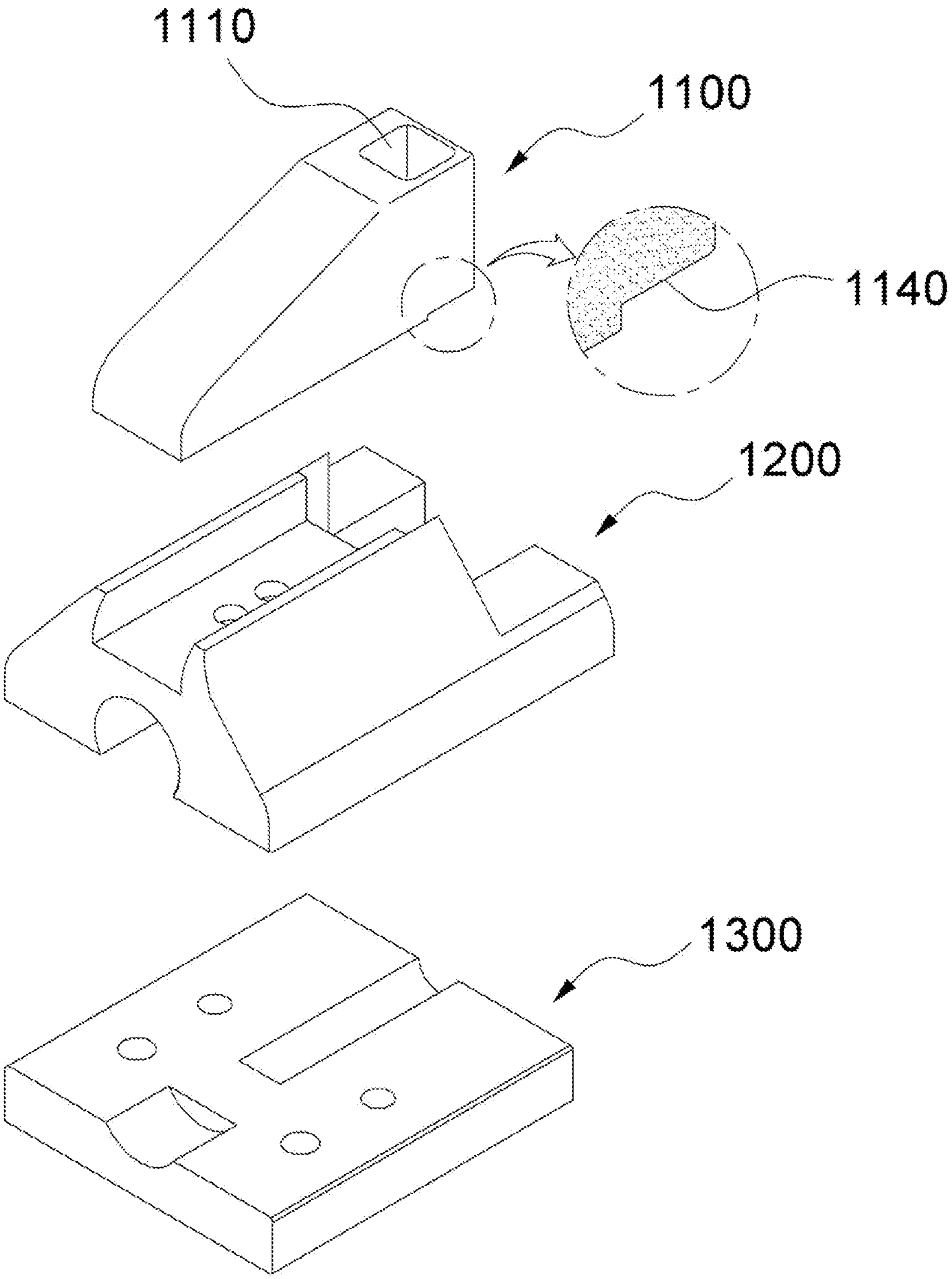
FIG. 4 shows other exploded conceptual views of the head immobilization module of the small animal intraventricular injection compensator according to the present invention.

In addition, with reference to FIG. 4, the guide part 1100 may be provided with an incision portion 1140 provided inward to allow an experimenter to check with the naked eye the degree of protrusion of the needle of the syringe S from the lower side where the guide hole 1121 is provided. This is to check how much the needle of the syringe S protrudes at an initial setting by considering that the length of the needle inserted into the ventricle of a small animal has an important effect on the experiment.

As shown in FIG. 3, the guide part may be manufactured by dividing into a first guide part 1100*a* and a second guide part 1100*b* or may be integrally manufactured as shown in FIG. 4. This is to keep in mind that the guide part may be replaced with various shapes according to shapes of the end portion into which the syringe S is inserted.

On the other hand, in the case of the most common rat among small animals, it has been reported that a pair of ventricles is located in each of regions that are located at one mm at medial-lateral regions in opposite directions of the head, wherein a center of a line connecting each of the regions is 0.3 mm backward in anterior-posterior directions of the head from the bregma, a central part of the brain.

In addition, with reference to FIG. 7, when the above description is represented through an appearance of the head, as shown in the drawing, the ventricle CV has been reported to be located between a virtual eye line connecting the pair of eye tails of a white rat and an ear line connecting the front of the ears of the rat. It has been reported that a pair of ventricles is located at each of opposite regions (referred to as AI in FIG. 6) located at one mm on the basis of the centerline CL connecting the center of the head.

Using this, the compensator is configured to fix the head of the small animal at the right position by allowing the tip portion of the eye tail of the small animal is aligned with the virtual end of the indicator 1400.

With reference to FIG. 8, the indicator 1400 is provided so that the experimenter determines whether the head inserted into the head accommodation space 1230 is disposed at the right position using the gap having the predetermined length and width provided between the side surface of the guide part 1100 and the side surface of the cradle 1210 on which the guide part 1100 is seated. It is possible to check whether the head of the small animal is immobilized at the right position by aligning the tip portion of the eye tail of the small animal with the virtual tip end portion 1410 of the indicator 1400. Through such indicator 1400 provided in a combined or integrated shape with the body 1200 and/or the guide part 1100, it may be checked whether the head of the small animal has been in place by fitting (aligning) the hole facing toward the eye tail of the small animal and the like with the eye tail of the small animal and the like.

Alternatively, as shown in FIG. 7, the indicator 1400 may be symmetrically provided in a pair in a hole shape perforated from one end of one side of the body 1200 to an opposite side. The line connecting each one end of the pair of indicators 1400 may be configured to coincide with the eye line. Therefore, when the small animal SA is immobilized in the state where the eye tails of the small animal SA are matched to the ends of the pair of indicators 1400, the small animal SA is always immobilized at a constant position. For more information on this, refer to Korean Patent Application No. 10-2018-0084044.

Meanwhile, with reference to FIG. 9, a protruding step 1250 protruding upward is provided at an end side of the head accommodation space 1230. A protruding step 1250 is also provided on the fixation part 1300. An experimenter grasps the head of the small animal and pushes it to the head accommodation space 1230. When immobilizing the head of the small animal through the indicator 1400, the head is raised by a predetermined height Δt by the protruding step 1250, thereby allowing the upper side of the head to contact the guide hole 1120.

It should not be interpreted that the technical spirit is limited to the above-described embodiments of the present invention. Naturally, the scope of application is various, and various modifications may be implemented at the level of those skilled in the art without departing from the gist of the present invention as claimed in the claims. Therefore, such improvements and modifications fall within the protection scope of the present invention as long as it is apparent to those skilled in the art.

The present invention relates to a small animal intraventricular injection compensator for injecting a drug through a syringe to a desired location. The present invention includes: a guide part 1100 provided with a guide hole 1120 into which a needle of a syringe (S) is inserted; a body 1200 comprising an upper cavity 1220 provided inside thereof and a cradle 1210 provided to seat the guide part 1120 on an upper side thereof; and a fixation part 1300 integrally provided with the body 1200 or separately provided, and comprising a lower cavity 1310 provided to allow a head accommodation space 1230, which a head of a small animal may enter into or exit from, to be provided inside thereof by corresponding to the upper cavity 1220. The small animal intraventricular injection compensator of the present invention has the following effects: the compensator enables the small animal to be uniformly immobilized at a specific position; anesthesia and immobilization of the small animal can be performed at the same time; and drug injection can be performed rapidly, accurately, and reproducibly by allowing the drug to be accurately injected into a ventricle of the small animal through the operation of inserting an injection needle into a guide hole.

The invention claimed is:

1. A small animal intraventricular injection compensator, the compensator comprising:

a body configured to cover a head of a small animal and comprising an upper cavity provided inside thereof to accommodate the head of the small animal therein and a cradle concavely formed on an upper surface of the body;

a guide part directly seated on the cradle in a replaceable manner and including a guide groove for inserting and fixing a syringe and a guide hole into which a needle of the syringe is inserted;

a fixation part integrally provided with the body or separately provided, and comprising a lower cavity provided to allow a head accommodation space, which the head of the small animal can enter into or exit from, to be provided inside thereof by corresponding to the upper cavity; and an indicator slit formed along a side of the cradle of the body and configured to allow an experimenter to see with naked eyes a predetermined portion of the head of the small animal inserted into the head accommodation space at an upper side of the guide part or the body.

2. The compensator of claim 1, wherein the guide part the guide groove has a polygonal sectional shape and sectional shapes of both the guide groove and a tip end side of the syringe inserted into the guide groove coincide with each other.

3. The compensator of claim 2, wherein the guide hole is eccentric by a predetermined distance to one side with respect to a centerline of the guide part, or a pair of guide holes is each provided to be spaced by a predetermined distance to opposite sides with respect to the centerline of the guide part.

4. The compensator of claim 1, further comprising: an anesthesia gas inlet provided on an opposite side of the head accommodation space.

5. The compensator of claim 1, wherein the guide part further comprises an incision portion provided inward to allow the experimenter to check with the naked eye a degree of protrusion of the needle of the syringe from the lower side where the guide hole is provided.

6. The compensator of claim 1, wherein the guide part, the body, and the fixation part are provided integrally, or are coupled to each other by magnetic force.

7. The compensator of claim 1, wherein the guide part comprises:

a second guide part seated on the cradle; and a first guide part coupled to a top side of the second guide part.

* * * * *